(12) United States Patent
Chang et al.

(10) Patent No.: US 7,231,326 B1
(45) Date of Patent: Jun. 12, 2007

(54) SYSTEM AND METHOD FOR GENERATING A SCANNING PROGRAM FOR A STAND-ALONE MEASURING EQUIPMENT

(75) Inventors: Chih-Kuang Chang, Tu-Cheng (TW); Xin-Yuan Wu, Shenzhen (CN); Jie-Rong Chen, Shenzhen (CN); Xiao-Dan Tang, Shenzhen (CN); Min Wang, Shenzhen (CN); Bing-Gen Yang, Shenzhen (CN)

(73) Assignees: Hong Fu Jin Precision Industry (Shenzhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 0 days.

(21) Appl. No.: 11/552,980

(22) Filed: Oct. 26, 2006

(30) Foreign Application Priority Data
Dec. 23, 2005 (CH) .................. 2005 1 0121206

(51) Int. Cl.
*G06T 17/00* (2006.01)
(52) U.S. Cl. ..................................... 702/196
(58) Field of Classification Search ................ 702/126, 702/196
See application file for complete search history.

(56) References Cited

U.S. PATENT DOCUMENTS

| 2003/0079002 A1 | 4/2003 | Fischer |
| 2003/0085890 A1* | 5/2003 | Baumberg et al. .......... 345/420 |

* cited by examiner

*Primary Examiner*—John Barlow
*Assistant Examiner*—Tung S. Lau
(74) *Attorney, Agent, or Firm*—Wei-Te Chung

(57) ABSTRACT

A computer-based method for generating a scanning program for a stand-alone measuring equipment is provided. The method includes the steps of: receiving parameters, the parameters including output types of probing points; calculating a probing point coordinate multidimensional array; creating probing features; generating 3D program of each probing feature, and forming a control file by assimilating all 3D programs; and transferring the control file to a computer in the measuring equipment and executing the control file by utilizing measuring software in the computer to measure a workpiece. A related system is also provided.

14 Claims, 3 Drawing Sheets

SYSTEM AND METHOD FOR GENERATING A SCANNING PROGRAM FOR A STAND-ALONE MEASURING EQUIPMENT

BACKGROUND OF THE INVENTION

1. Field of the Invention

The present invention generally relates to systems and methods for programming measuring equipments, and more particularly to a system and method for generating a scanning program for a stand-alone measuring equipment.

2. Description of Related Art

With improvements of measuring equipment precisions, measuring equipments have become more complex during configuration, thus, causing more using difficulties.

Currently, 3D measuring equipments have high measuring precisions and high measuring speeds when measuring physical dimensions and geometric tolerances of a product. For the purpose of measuring physical dimensions and geometric tolerances of a product with high measuring precision and high measuring speed, the 3D measuring equipments are programmed with a measuring program created by a computer. The computer is configured in the 3D measuring equipment, and co-works with the 3D measuring equipment together.

When programming a measuring program especially when programming required measuring equipments, it needs to determine probing points of the measured product manually. This leads to quite a few disadvantages. Firstly, there are too many repetitive operations, thus having low efficiency. Secondly, the probing points may not be conformed to a regular pattern.

What is needed, therefore, is a system and method for generating a scanning program for a stand-alone measuring equipment, which can ensure reasonableness and high efficiency of probing point distributions.

SUMMARY OF THE INVENTION

A system for generating a scanning program for a stand-alone measuring equipment is executed in a first computer which is linked with a measuring equipment. The measuring equipment includes a second computer installed measuring software. The system includes: an input module configured for receiving scanning mode parameters, scanning output parameters, and for selecting a set of surfaces of a workpiece for generating corresponding probing points on the surfaces, the scanning output parameters comprising output types of the probing points in each surface selected; a calculating module configured for calculating a total column count and a total row count of all probing points in all the surfaces selected, and calculating a normal vector corresponding to a surface of each probing point according to the scanning mode parameters and the surfaces selected of the workpiece, obtaining a probing point coordinate multidimensional array according to the probing point coordinates on all of the surfaces selected, checking the validity of each probing point coordinate in the probing point coordinate multidimensional array, and attaining a significant probing point coordinate multidimensional array by deleting any insignificant probing point coordinates, a significant probing point coordinate meaning that: there exists a deviated point that lies within the normal vector of the probing point coordinate or in an opposite of the normal vector such that the deviated point lies within a mass of the workpiece; a creating module configured for creating a probing feature for the probing points on each surface selected according to the output types, and for storing identifications of the probing features in a probing feature parameter queue; a generating module configured for generating a 3D scanning program for each probing feature according to the probing feature parameter queue with probing feature identifications, and forming a control file by assimilating all the 3D scanning programs; and an output module configured for transferring the control file to the second computer, and for executing the control file by utilizing the measuring software to measure the workpiece.

A computer-based method for generating a scanning program for a stand-alone measuring equipment is provided. The method includes the steps of: (a) receiving scanning mode parameters, scanning output parameters, and selecting a set of surfaces of a workpiece for generating corresponding probing points on the surfaces, the scanning output parameters comprising output types of the probing points in each surface selected; (b) calculating a total column count and a total row count of all probing points in all the surfaces selected, and calculating a normal vector corresponding to a surface of each probing point according to the scanning mode parameters and the surfaces selected of the workpiece; (c) obtaining a probing point coordinate multidimensional array according to the probing point coordinates on all of the surfaces selected, (d) checking the validity of each probing point coordinate in the probing point coordinate multidimensional array, and attaining a significant probing point coordinate multidimensional array by deleting any insignificant probing point coordinates, a significant probing point coordinate meaning that: there exists a deviated point that lies within the normal vector of the probing point coordinate or in an opposite of the normal vector such that the deviated point lies within a mass of the workpiece; (e) creating a probing feature for the probing points on each surface selected according to the output types, and storing identifications of the probing features in a probing feature parameter queue; (f) generating a 3D scanning program for each probing feature according to the probing feature parameter queue with probing feature identifications, and forming a control file by assimilating all the 3D scanning programs; and (g) transferring the control file to a computer in the measuring equipment, and executing the control file by utilizing the measuring software to measure the workpiece.

Other advantages and novel features of the present invention will become more apparent from the following detailed description of preferred embodiments when taken in conjunction with the accompanying drawings, in which:

DETAILED DESCRIPTION OF THE INVENTION

Figure 1:
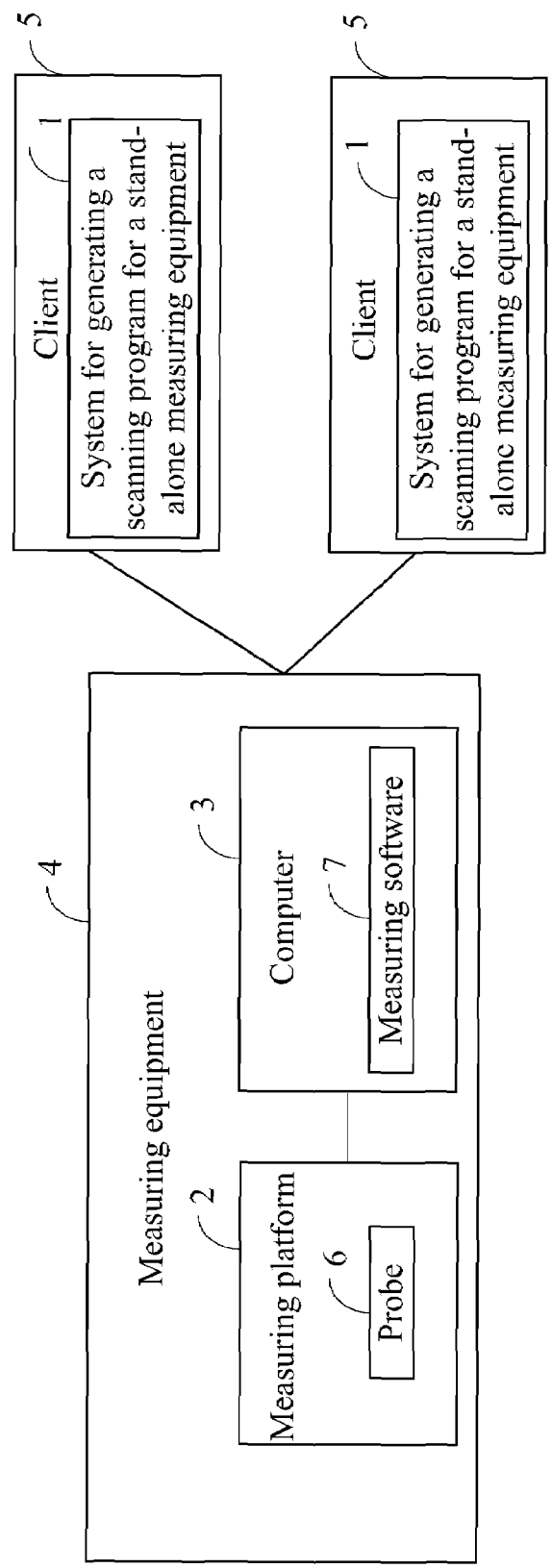
FIG. 1 is a schematic diagram of a hardware configuration of a system for generating a scanning program for a stand-alone measuring equipment in accordance with a preferred embodiment.

FIG. 1 is a schematic diagram of a hardware configuration of a system for generating a scanning program for a stand-alone measuring equipment in accordance with a preferred embodiment. The system 1 for generating the scanning program for a stand-alone measuring equipment (hereinafter, "the system 1") is executable/invoked in a computer 3. The computer 3 is a part of the measuring equipment 4 and is installed with measuring software 7 for executing the scanning program to measure a workpiece. The measuring equipment 4 further includes a measuring platform 2 linked to the computer 3 via a data cable. A probe 6 is configured on the measuring platform 2 for scanning the workpiece. The system 1 can also be executed with a plurality of clients 5 (only two shown) linked to the measuring equipment 4. In an alternative embodiment, the clients 5 can further work independently without any type of communication links with the measuring equipment 4.

The system 1 includes a plurality of function modules. The function modules are configured for generating the scanning program executable by the measuring equipment 4. Afterwards, the scanning program generated by the client 5 is transferred to the computer 3. The computer 3 executes the scanning program by utilizing the measuring software 7 that controls the measuring platform 2 to measure the workpiece. The computer 3 receives measuring results transmitted from the measuring platform 2 through the data cable, analyzes the measuring results, and displays the measuring results analyzed in a chart.

Figure 2:
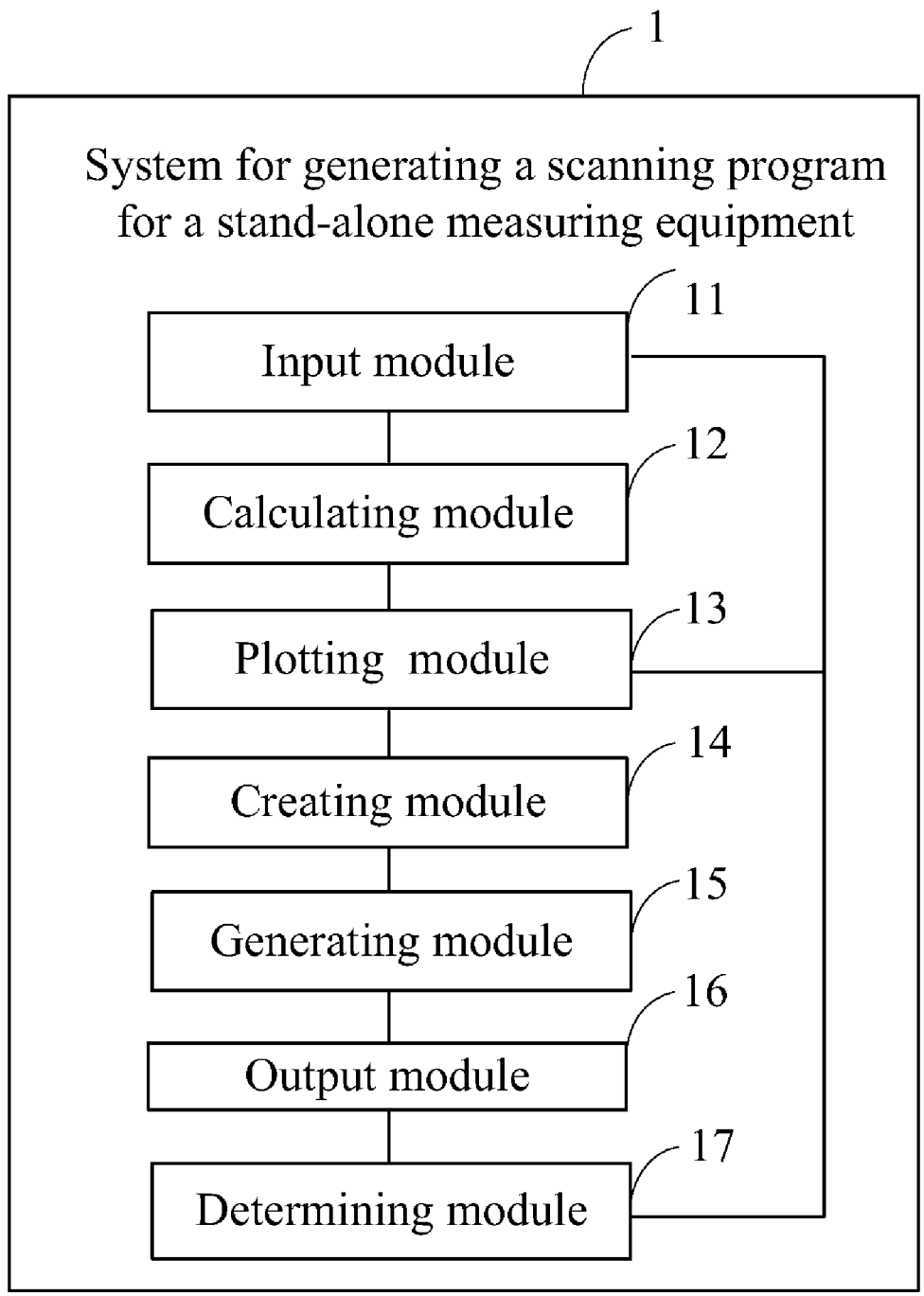
FIG. 2 is a schematic diagram of main function modules of the system of FIG. 1.

FIG. 2 is a schematic diagram of main function modules of the system 1. The system 1 typically includes an input module 11, a calculating module 12, a plotting module 13, a creating module 14, a generating module 15, an output module 16, and a determining module 17.

The input module 11 is configured for receiving scanning mode parameters, scanning output parameters, and for selecting a set of surfaces of the workpiece in order to generate corresponding probing points on the surfaces. The scanning mode parameters may include three scanning modes for computing the number of probing points on each surface selected. The first mode receives a column count and a row count, and computes the number of probing points on each surface selected by multiplying the column count with the row count. The second mode receives a total number of probing points on each surface selected. The third mode determines the number of the probing points on each surface selected by performing a table search according to a color and an area of the surface selected. The output parameters include output types of the probing points on each surface selected. The output types may include a point type, a line type, a surface type, and a circle type. The output parameters may further include a plot path setting parameter for selecting whether or not to plot a probing path of the probe 6 while measuring the workpiece.

The calculating module 12 is configured for calculating a total column count and a total row count of all probing points on all of the surfaces selected according to the scanning mode parameters and the surfaces selected of the workpiece, for calculating a normal vector of the probing point on each of the surfaces selected, for creating a probing point coordinate multidimensional array according to the probing point coordinates on all of the surfaces selected, for checking the validity of each probing point coordinate in the probing point coordinate multidimensional array, and for attaining a significant probing point coordinate multidimensional array by deleting any insignificant probing point coordinates.

In depth, each probing point coordinate consists of a real probing point coordinate (x, y, z) and a normal vector $N(i, j, k)$ of (x, y, z) corresponding to a surface of the probing point. A significant probing point coordinate $\{(x_1, y_1, z_1), N(i_1, j_1, k_1)\}$ means that: there exists a deviated point that lies within the normal vector $N(i_1, j_1, k_1)$ or in an opposite of the normal vector $N(i_1, j_1, k_1)$ of the probing point coordinate (x, y, z) such that the deviated point lies within a mass of the workpiece. Otherwise, if the deviated does not lie within the mass of the workpiece, this means that the probing point coordinate $\{(x_1, y_1, z_1), N(i_1, j_1, k_1)\}$ is insignificant, and should be deleted from the probing point coordinate multidimensional array.

The plotting module 13 is configured for plotting probing paths of the probe 6. In depth, the probe 6 moves through all the point coordinates in the significant probing point coordinate multidimensional array according to predetermined iteration of indices of the significant probing point coordinate multidimensional array.

The creating module 14 is configured for creating a probing feature for the probing points on one surface selected according to the output types, and for storing identifications of the created probing features in a probing feature parameter queue. In depth, if the output type of the probing points is a point type, the creating module 14 creates a point feature by assimilating the probing points. If the output type of the probing points is a line type, the creating module 14 creates a line feature by assimilating the probing points. If the output type of the probing points is a surface type, the creating module 14 creates a surface feature by assimilating the probing points. If the output type of the probing points is a circle type, the creating module 14 creates a circle feature by assimilating the probing points.

The generating module 15 is configured for generating a 3D scanning program for each probing feature according to the created probing feature parameter queue with probing feature identifications, and forming a control file by assimilating all the 3D scanning programs. In depth, the generating module 15 first generates a type name of each probing feature according to the type of the probing feature, then outputs corresponding probing point coordinates that are assimilated into the probing feature.

The output module 16 is configured for transferring the control file generated in the client 5 to the computer 3, and the computer 3 executes the control file by utilizing the measuring software 7 to measure the workpiece.

The determining module 17 is configured for determining whether or not to plot probing paths of the probe 6 according to the plot path setting parameter received by the input module 11.

Figure 3:
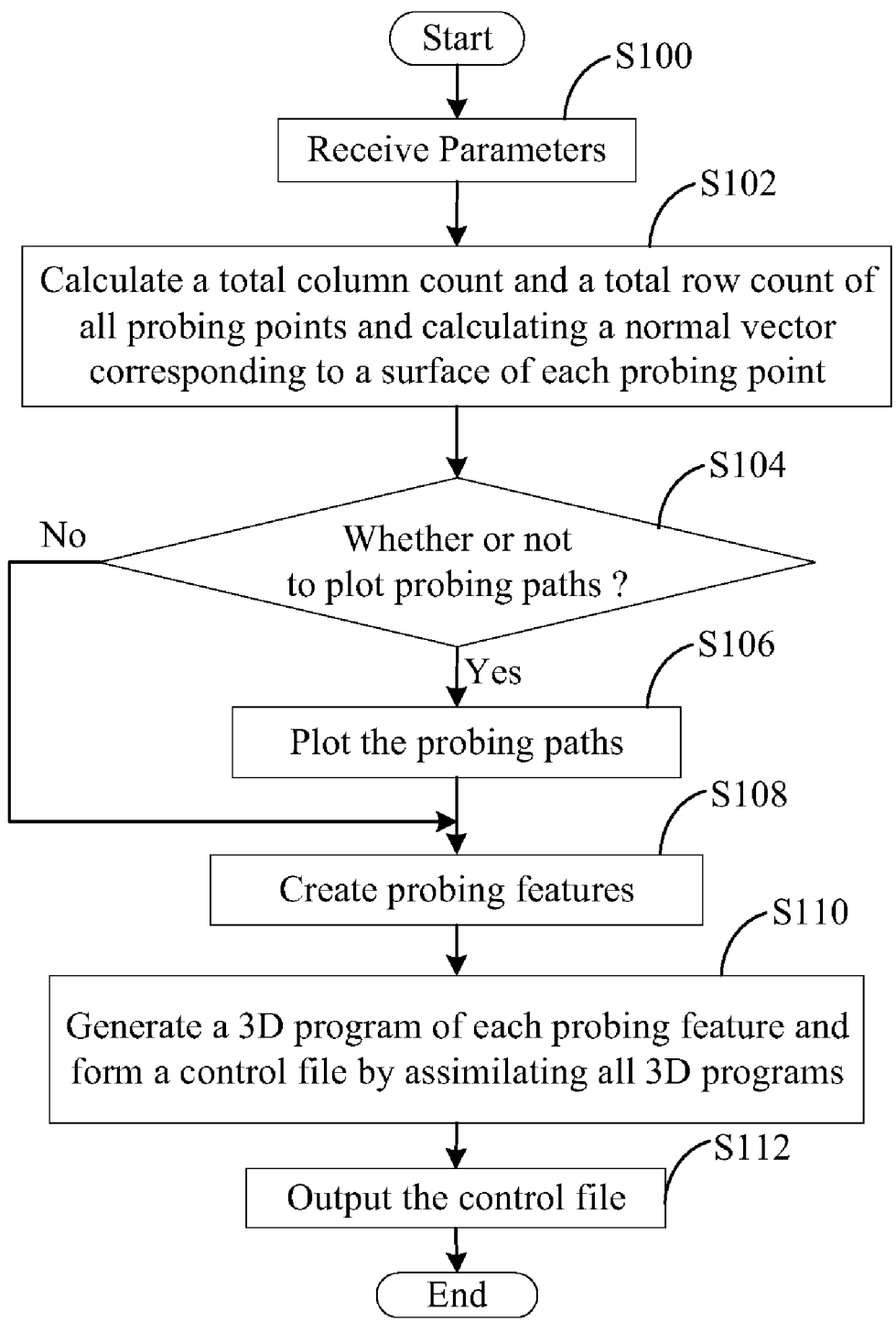
FIG. 3 is a flowchart of a preferred method for generating a scanning program for a stand-alone measuring equipment by utilizing the system of FIG. 1.

FIG. 3 is a flowchart of a method for generating the scanning program for the stand-alone measuring equipment by utilizing the system 1. In step S100, the input module 11 receives the scanning mode parameters, the scanning output parameters, and selects the set of surfaces of the workpiece for generating corresponding probing points on the surfaces selected.

In step S102, the calculating module 12 calculates the total column count and the total row count of all probing points in all the surfaces selected, and calculates the normal vector corresponding to a surface of each probing point according to the scanning mode parameters and the surfaces selected of the workpiece, obtaining the probing point coordinate multidimensional array according to the total column count and the total row count, checking the validity of each probing point coordinate in the probing point coordinate multidimensional array, and attaining a significant probing point coordinate multidimensional array by deleting any insignificant probing point coordinates.

In step S104, the determining module 17 determines whether or not to plot probing paths of the probe 6 according to the plot path setting parameter received by the input module 11. If the plot path setting parameter is not set to plot probing paths of the probe 6, the procedure goes to step S108.

If the plot path setting parameter is set to plot the probing paths of the probe 6, in step S106, the plotting module 13 plots the probing paths of the probe 6 to measure the workpiece. In depth, the probe 6 moves through all the point coordinates in the significant probing point coordinate multidimensional array according to predetermined iteration of indices of the significant probing point coordinate multidimensional array.

In step S108, the creating module 14 creates the probing feature for the probing points on one surface selected according to the output types, and for storing the identifications of the created probing features in the probing feature parameter queue.

In step S110, the generating module 15 generates the 3D scanning program for each probing feature according to the probing feature parameter queue created with probing feature identifications, and forming the control file by assimilating all the 3D scanning programs. In depth, the generating module 15 first generates the type name of each probing feature according to the type of the probing feature, then outputs corresponding probing point coordinates that are assimilated into the probing feature.

In step S112, the output module 16 transfers the control file generated in the client 5 to the computer 3, and the computer 3 executes the control file by utilizing the measuring software 7 to measure the workpiece.

It should be emphasized that the above-described embodiments of the present invention, particularly, any "preferred" embodiments, are merely possible examples of implementations, merely set forth for a clear understanding of the principles of the invention. Many variations and modifications may be made to the above-described embodiment(s) of the invention without departing substantially from the spirit and principles of the invention. All such modifications and variations are intended to be included herein within the scope of this disclosure and the present invention and protected by the following claims.

What is claimed is:

1. A system for generating a scanning program for a stand-alone measuring equipment, the system being executed in a first computer that is linked with the measuring equipment, the measuring equipment comprising a second computer installed with measuring software, the system comprising:

an input module configured for receiving scanning mode parameters, scanning output parameters, and for selecting a set of surfaces of a workpiece for generating corresponding probing points on the surfaces, the scanning output parameters comprising output types of the probing points in each surface selected;

a calculating module configured for calculating a total column count and a total row count of all probing points in all the surfaces selected, and calculating a normal vector corresponding to a surface of each probing point according to the scanning mode parameters and the surfaces selected of the workpiece, obtaining a probing point coordinate multidimensional array according to the probing point coordinates on all of the surfaces selected, checking the validity of each probing point coordinate in the probing point coordinate multidimensional array, and attaining a significant probing point coordinate multidimensional array by deleting any insignificant probing point coordinates, a significant probing point coordinate meaning that: there exists a deviated point that lies within the normal vector of the probing point coordinate or in an opposite of the normal vector such that the deviated point lies within a mass of the workpiece;

a creating module configured for creating a probing feature for the probing points on each surface selected according to the output types, and for storing identifications of the probing features in a probing feature parameter queue;

a generating module configured for generating a 3D scanning program for each probing feature according to the probing feature parameter queue with probing feature identifications, and forming a control file by assimilating all the 3D scanning programs; and an output module configured for transferring the control file to the second computer, and for executing the control file by utilizing the measuring software to measure the workpiece.

2. The system as claimed in claim 1, wherein the scanning output parameters further comprise a plot path setting parameter for setting whether or not to plot probing paths of a probe in the measuring equipment when measuring the workpiece.

3. The system as claimed in claim 1, wherein the scanning mode is selected from the group consisting of a first mode by receiving a column number and a row count and computing the number of probing points on each surface selected by multiplying the column number with the row number, a second mode by receiving a total number of probing points on each surface selected, and a third mode by performing a table search according to a color and an area of each surface selected.

4. The system as claimed in claim 2, further comprising a plotting module configured for plotting probing paths of the probe if the plot path setting parameter is set to plot probing paths.

5. The system as claimed in claim 2, further comprising a determining module for determining whether or not to plot probing paths according to the plot path setting parameter.

6. The system as claimed in claim 1 wherein the output types of the probing points comprise a point type, a line type, a surface type, and a circle type.

7. A computer-based method for generating a scanning program for a stand-alone measuring equipment, the method comprising the steps of:

receiving scanning mode parameters, scanning output parameters, and selecting a set of surfaces of a workpiece for generating corresponding probing points on the surfaces, the scanning output parameters comprising output types of the probing points in each surface selected;

calculating a total column count and a total row count of all probing points in all the surfaces selected, and calculating a normal vector corresponding to a surface of each probing point according to the scanning mode parameters and the surfaces selected of the workpiece;

obtaining a probing point coordinate multidimensional array according to the probing point coordinates on all of the surfaces selected;

checking the validity of each probing point coordinate in the probing point coordinate multidimensional array, and attaining a significant probing point coordinate multidimensional array by deleting any insignificant probing point coordinates, a significant probing point coordinate meaning that: there exists a deviated point that lies within the normal vector of the probing point coordinate or in an opposite of the normal vector such that the deviated point lies within a mass of the workpiece;

creating a probing feature for the probing points on each surface selected according to the output types, and storing identifications of the probing features in a probing feature parameter queue;

generating a 3D scanning program for each probing feature according to the probing feature parameter queue with probing feature identifications, and forming a control file by assimilating all the 3D scanning programs; and transferring the control file to a computer in the measuring equipment, and executing the control file by utilizing measuring software in the computer to measure the workpiece.

8. The system as claimed in claim 7, wherein the scanning mode is selected from the group consisting of a first mode by receiving a column number and a row count and computing the number of probing points on each surface selected by multiplying the column number with the row number, a second mode by receiving a total number of probing points on each surface selected, and a third mode by performing a table search according to a color and an area of each surface selected.

9. The system as claimed in claim 7, wherein the scanning output parameters further comprise a plot path setting parameter for setting whether or not to plot probing paths of a probe in the measuring equipment when measuring the workpiece.

10. The method as claimed in claim 9, before the step of generating 3D program for each probing feature, further comprising the step of:

plotting probing paths of the probe on the measuring equipment if the plot path setting parameter is set to plot probing paths in the received parameters.

11. The method as claimed in claim 7, wherein the output types of the probing points comprise a point type, a line type, a surface type, and a circle type.

12. A system for generating a scanning program for a stand-alone measuring equipment, the system being executed in a first computer that is linked with the measuring equipment, the measuring equipment comprising a second computer installed with measuring software, the system comprising:

an input module configured for receiving scanning mode parameters, scanning output parameters, and for selecting a set of surfaces of a workpiece for generating corresponding probing points on the surfaces, the scanning output parameters comprising output types of the probing points in each surface selected; and a calculating module configured for calculating a total column count and a total row count of all probing points in all the surfaces selected, and calculating a normal vector corresponding to a surface of each probing point according to the scanning mode parameters and the surfaces selected of the workpiece, obtaining a probing point coordinate multidimensional array according to the probing point coordinates on all of the surfaces selected, checking the validity of each probing point coordinate in the probing point coordinate multidimensional array, and attaining a significant probing point coordinate multidimensional array by deleting any insignificant probing point coordinates, a significant probing point coordinate meaning that: there exists a deviated point that lies within the normal vector of the probing point coordinate or in an opposite of the normal vector such that the deviated point lies within a mass of the workpiece.

13. The system as claimed in claim 12, further comprising a creating module configured for creating a probing feature for the probing points on each surface selected according to the output types, and for storing identifications of the probing features in a probing feature parameter queue.

14. The system as claimed in claim 13, further comprising a generating module configured for generating a 3D scanning program for each probing feature according to the probing feature parameter queue with probing feature identifications, and forming a control file by assimilating all the 3D scanning programs.

* * * * *